(12) United States Patent
Moresco

(10) Patent No.: US 6,570,821 B1
(45) Date of Patent: May 27, 2003

(54) LOW-NOISE TOWED ACOUSTIC LINEAR ANTENNA

(75) Inventor: Gilles Moresco, Le Cannet (FR)

(73) Assignee: Thales Underwater Systems S.A.S., Sophia Antipolis (FR)

( * ) Notice: Subject to any disclaimer, the term of this patent is extended or adjusted under 35 U.S.C. 154(b) by 0 days.

(21) Appl. No.: 10/129,822

(22) PCT Filed: Nov. 7, 2000

(86) PCT No.: PCT/FR00/03093

§ 371 (c)(1), (2), (4) Date: May 9, 2002

(87) PCT Pub. No.: WO01/35123

PCT Pub. Date: May 17, 2001

(30) Foreign Application Priority Data

Nov. 10, 1999 (FR) .............................. 99 14135

(51) Int. Cl.⁷ .............................. G01V 1/38; G01V 1/20
(52) U.S. Cl. .......................... 367/154; 367/153; 367/20; 174/101.5
(58) Field of Search ................................ 367/153, 154, 367/20; 174/101.5

(56) References Cited

U.S. PATENT DOCUMENTS

| | | | |
|---|---|---|---|
| 3,900,543 A | * | 8/1975 | Davis .......................... 367/154 |
| 4,300,218 A | | 11/1981 | Kruka et al. |
| 4,733,379 A | | 3/1988 | Lapetina et al. |
| 4,762,208 A | | 8/1988 | Reynier et al. |
| 4,918,666 A | * | 4/1990 | Beauducel et al. ............ 367/15 |
| 5,606,329 A | * | 2/1997 | Ramotowski et al. ....... 343/709 |
| 5,745,436 A | | 4/1998 | Bittleston |
| 5,777,954 A | | 7/1998 | Hepp |
| 5,902,430 A | | 5/1999 | Carpenter et al. |
| 5,943,293 A | * | 8/1999 | Luscombe et al. ............ 367/20 |

FOREIGN PATENT DOCUMENTS

DE    38 09 349    10/1989

* cited by examiner

Primary Examiner—Ian J. Lobo
(74) Attorney, Agent, or Firm—Oblon, Spivak, McClelland, Maier & Neustadt, P.C.

(57) ABSTRACT

Towed low-noise linear acoustic antennas configured for seismic exploration. The jacket of this antenna is pierced with holes that allow seawater to enter the inside of the antenna. The hydrophones are isolated by enclosing them in polyurethane envelopes filled with oil or gel. Buoyancy is ensured by lightening the jacket with hollow inclusions formed from microspheres. Such a structure allows the output noise level of the hydrophones to be reduced by 15 dB.

6 Claims, 1 Drawing Sheet

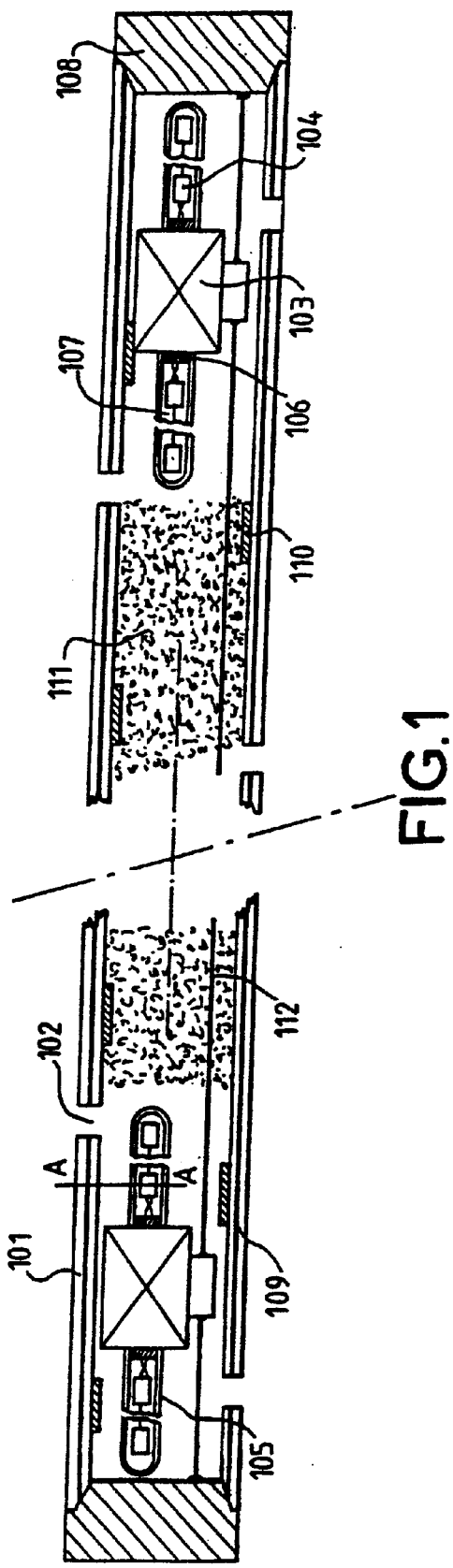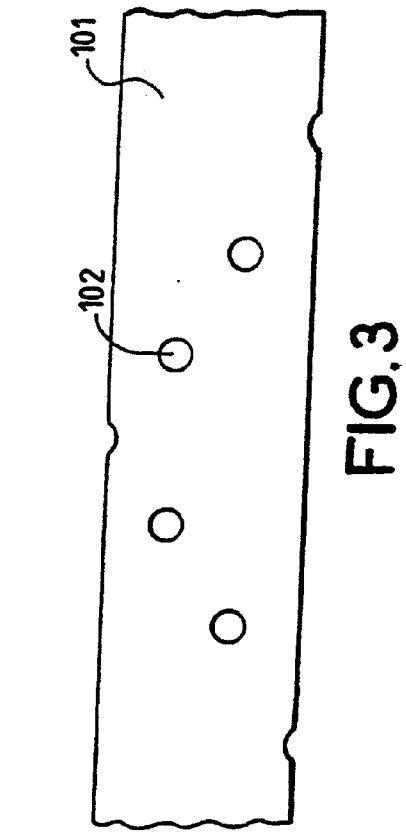

LOW-NOISE TOWED ACOUSTIC LINEAR ANTENNA

BACKGROUND OF THE INVENTION

1. Field of the Invention

The present invention relates to towed low-noise linear acoustic antennas intended especially for subsea seismic exploration. In this field, these antennas are known as <<streamers>>.

2. Discussion of the Background

PCT patent application WO 96/24861 discloses a towed linear antenna (TLA) consisting mainly of a jacket provided with cables made of <<KEVLAR>> (registered trademark) in order to ensure tensile strength, with rings to ensure radial strength of the jacket and with a cellular open-cell foam filling all of the inside of the jacket. This foam, in which the hydrophones and the electronic circuits are embedded, is impregnated with a dielectric oil having a density of less than 1, making it possible to ensure buoyancy of the antenna (density equal to that of seawater).

The major drawback of this technique is the fact that the vibrations induced by towing are transmitted via the <<KEVLAR>> cables to the jacket and then to the hydrophones. There is therefore acoustic coupling between the hydrophones and the structure.

A solution which does not have the aforementioned drawbacks is also known from U.S. Pat. No. 4,300,218. That solution isolates each hydrophone in a metal casing, which is itself decoupled from the structure. This technique is known as the "free-flooded" technique. It is also necessary for the spaces between the hydrophones to be filled with a low-density material in order to ensure buoyancy. This solution is expensive, especially with regard to the fill material, and does not allow the diameter to be reduced to the value that would be desired, for example 40 mm.

SUMMARY OF THE INVENTION

To alleviate these drawbacks, the invention provides a towed low-noise linear acoustic antenna, comprising a jacket containing a set of hydrophones linked by connections, principally characterized in that the jacket has a set of holes distributed over its surface and allowing the external medium in which the antenna is submerged to be brought into communication with the inside of this antenna, in order to acoustically decouple the hydrophones from the structure of the antenna.

According to another feature, the holes are distributed over the surface of the antenna along a helical line.

According to another feature, the area of all these holes represents about a few $cm^2$ per linear meter.

According to another feature, the jacket is manufactured from a material lightened by hollow inclusions, in order to ensure buoyancy of the antenna.

According to another feature, these inclusions are microspheres.

According to another feature, the material is polyurethane.

According to another feature, the hydrophones are contained in sealed plastic envelopes filled with a substance allowing electrical isolation from the external medium and matching of the acoustic impedance.

According to another feature, the free space inside the jacket is filled with open-cell foam.

BRIEF DESCRIPTION OF THE DRAWINGS

Further particular aspects and advantages of the invention will become more clearly apparent in the following description, given with regard to the appended figures which show:

FIG. 1, a longitudinal sectional view of a segment of an antenna according to the invention;

FIG. 2, a radial sectional view of the segment in FIG. 1, taken at A—A; and

FIG. 3, an external view of the jacket of this segment, showing holes made according to the invention.

DESCRIPTION OF THE PREFERRED EMBODIMENTS

Referring to the appended figures, the principle of the invention consists in making holes 102 in the jacket 101 of the antenna or of the sections forming the antenna. Acoustic coupling between the hydrophones and the structure of the antenna is thus greatly reduced. Experiments have shown that the output noise level of the hydrophones can thus be reduced by 15 dB.

These holes are preferably made along a helical line and have an area of a few $cm^2$ per linear meter.

The seawater then fills the inside of the jacket, passing through these holes. To ensure buoyancy, compensating for the weight of the objects located inside the latter, the jacket is manufactured from a material, for example polyurethane, which has been lightened by incorporating into it, at the time of extrusion, hollow inclusions, for example microspheres. Its thickness, relative to the overall diameter, is chosen in order to obtain an overall density allowing buoyancy.

In a preferred embodiment, the streamer includes a certain number of electronic modules 103, each supporting two groups of hydrophones 104. Each hydrophone group is sealed by means of a sealed plastic envelope 105, for example made of polyurethane or PVC, clamped onto an end-piece 106 integral with the electronic module. Isolation from the external medium and acoustic impedance matching is obtained by filling the envelope with a suitable substance 107, for example paraffin oil or a gel.

As a variant, the invention provides for the hydrophones to be molded in a variety of polyurethane whose <<pc>> coefficient is equal to that of seawater.

The electronic modules are linked together and to the two end junctions 108 by a bus 112 along which the multiplexed data coming from the hydrophones, and the synchronization signals, flow. All the connections at the modules and the junctions are sealed.

As in the prior art, the jacket is provided with cables 109 made of KEVLAR™ for taking up tensile loads and with a hoop reinforcement system 110, made in this example by means of rings as in the PCT patent WO 96/24861.

In a preferred embodiment, open-cell foam 111 is introduced between the modules so as to facilitate the jacketing of the "string" formed by the internal members of the antenna or of the section. Before this jacketing, all of this "string" is treated with an antifouling material, just as for the jacket.

It would not be outside the scope of the invention if each electronic module were to comprise one hydrophone per envelope, or if there were only one envelope per module, said envelope being provided with one or more hydrophones. It will be noted that the density of the oil or of the gel contained in each envelope may be less than that of water in order to adjust the buoyancy if the jacket does not suffice.

Apart from the reduction in acoustic coupling, the invention has the advantage of eliminating the navigation instabilities associated with the difference in density between the liquid contained inside the envelope and the seawater in which the antenna is submerged.

Finally, if the envelopes are filled with gel, there is, in the event of a leak, no impact on the environment because of the absence of oil.

What is claimed is:

1. A towed low-noise linear acoustic antenna, comprising:
   a jacket containing a set of hydrophones linked by connections, wherein the hydrophones are contained in sealed plastic envelopes filled with a substance allowing isolation from the external medium and matching of acoustic impedance, the sealed plastic envelopes being brought into communication with an external medium in which the antenna is submerged to acoustically decouple the hydrophones from a structure of the antenna;
   wherein the bringing into communication is accomplished by a set of holes distributed over a surface of the jacket and allowing the external medium in which the antenna is submerged to be brought into communication with an inside of the antenna, and
   wherein the jacket is manufactured from a material lightened by hollow inclusions, to promote buoyancy of the antenna.

2. The antenna as claimed in claim 1, wherein the holes are distributed over a surface of the antenna along a helical line.

3. The antenna as claimed in claim 1, wherein an area of all the holes represents about a few $cm^2$ per linear meter.

4. The antenna as claimed in claim 1, wherein the hollow inclusions are microspheres.

5. The antenna as claimed in claim 1, wherein the material is polyurethane.

6. The antenna as claimed in claim 1, wherein a free space inside the jacket is filled with open-cell foam.

* * * * *